United States Patent [19]

Ohkoshi et al.

[11] Patent Number: 4,533,850
[45] Date of Patent: Aug. 6, 1985

[54] COLOR PROJECTOR APPARATUS OF SINGLE CATHODE RAY TUBE TYPE

[75] Inventors: Akio Ohkoshi, Tokyo; Takashi Toyama, Kokubunji; Toshiro Watanabe, Zushi, all of Japan

[73] Assignee: Sony Corporation, Tokyo, Japan

[21] Appl. No.: 474,133

[22] Filed: Mar. 10, 1983

[30] Foreign Application Priority Data

Mar. 19, 1982 [JP] Japan .................... 57-45200

[51] Int. Cl.³ .................. H01J 7/26; H01J 29/10
[52] U.S. Cl. ............................ 313/36; 313/44; 313/461; 313/471
[58] Field of Search ........... 313/471, 478, 461, 474, 313/36, 44, 45, 46; 358/60, 64, 67

[56] References Cited

U.S. PATENT DOCUMENTS

| | | | |
|---|---|---|---|
| 3,524,197 | 8/1970 | Soule | 313/44 X |
| 3,531,674 | 9/1970 | Spencer | 313/44 |
| 3,875,450 | 4/1975 | Thompson | 313/471 |
| 4,034,398 | 7/1977 | Sheldrake et al. | 313/474 X |

FOREIGN PATENT DOCUMENTS 2098393A 11/1982 United Kingdom ............. 313/478

Primary Examiner—David K. Moore
Assistant Examiner—K. Wieder
Attorney, Agent, or Firm—Hill, Van Santen, Steadman & Simpson

[57] ABSTRACT

A color projector apparatus including a single cathode ray tube of index-type having a first transparent panel with phosphor elements of three primary colors and an indexing element formed on the inner surface thereof, a second transparent panel located in front of the first transparent panel of cathode ray tube, a metal frame-shape spacer for supporting the second transparent panel, and a transparent liquid coolant filled into the space between the first and second transparent panels.

3 Claims, 12 Drawing Figures

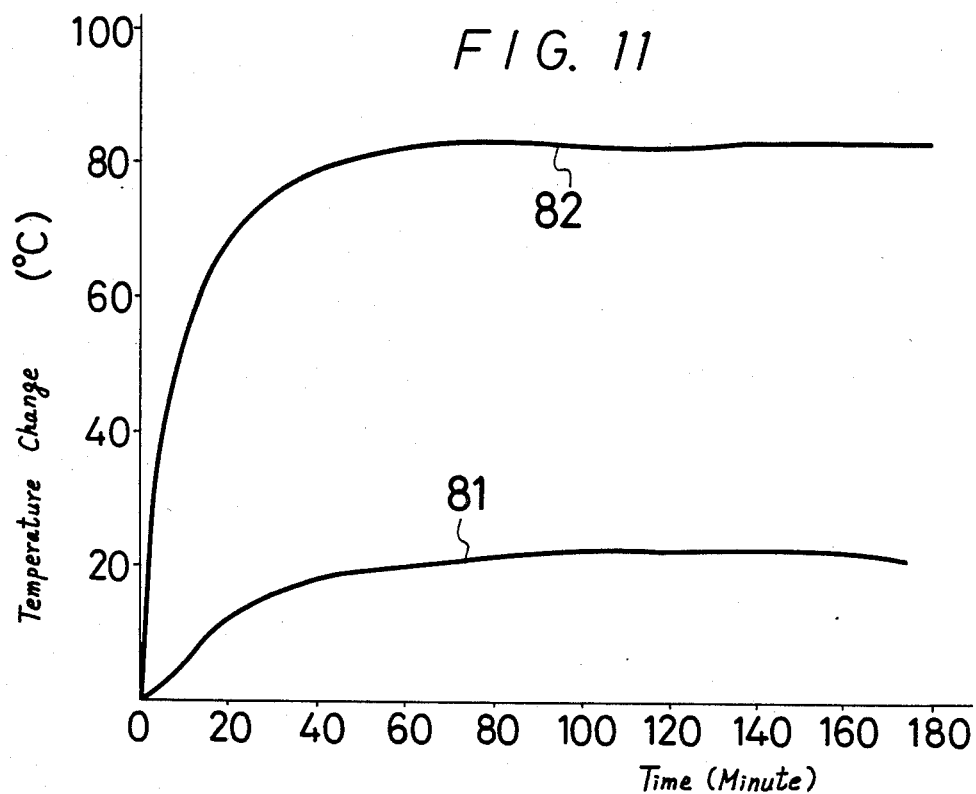
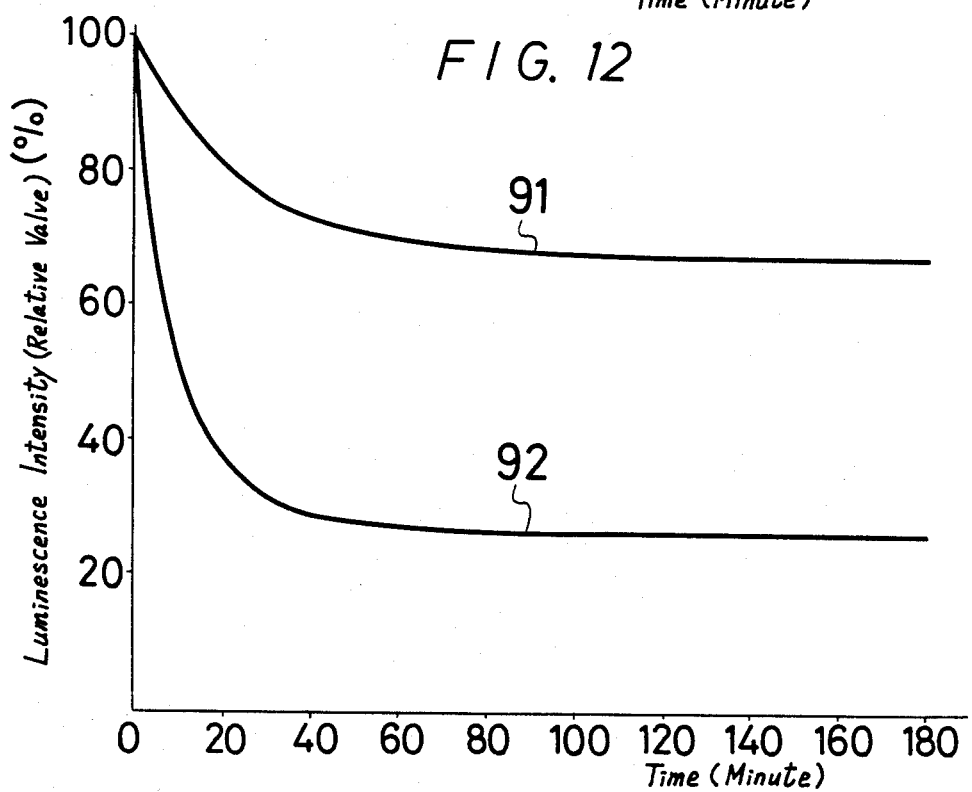

COLOR PROJECTOR APPARATUS OF SINGLE CATHODE RAY TUBE TYPE

BACKGROUND OF THE INVENTION

1. Field of the Invention

This invention relates generally to a projector apparatus and more particularly is directed to a color projector apparatus of single cathode ray tube type by which a color picture such as a television video picture or the like is magnified and then projected onto a screen.

2. Description of the Prior Art

In the art, various projector apparatuses of this kind have been proposed. As, for example, shown in FIG. 1, a projector apparatus is proposed which includes three cathode ray tubes, 1R, 1G and 1B which reproduce picture images of three primary color components of red, green and blue, respectively. The reproduced red, green and blue picture images from these cathode ray tubes 1R, 1G and 1B are respectively magnified and projected onto a common screen 3 by corresponding lens systems, 2R, 2G and 2B in such a way that the reproduced picture images from the respective cathode ray tubes, 1R, 1G and 1B are synthesized one another on the common screen 3 as a color image. In this case, the respective picture of each color is formed by each monochromatic cathode ray tube and hence the bright synthesized picture image can be projected. Since the projected images of respective colors have to be coincident with one another with precision on the screen 3, the position of the respective lens systems, 2R, 2G and 2B relative to the cathode ray tubes, 1R, 1G and 1B are fixed and a distance between the projection screen 3 and each of the lens systems, 2R, 2G and 2B is fixed, giving rise to a restriction in the use thereof. Moreover, color shading occurs depending on the position of a viewer.

Whereas, as shown in FIG. 2, there has been proposed another projector apparatus in which red, green and blue picture images from monochromatic cathode ray tubes, 1R, 1G and 1B are respectively passed through two dichroic mirrors, 4a and 4b, coincided one another on the optical axis of a common lens 2 and magnified thereby and then projected onto a screen 3 as a synthesized color picture image. In this case, the distances among the cathode ray tubes, 1R, 1G and 1B of respective colors, namely, the object points and the common lens system 2 are respectively determined substantially equal. This distance, however, can not be reduced sufficiently due to the existence of the dichroic mirrors, 4a and 4b, requiring the use of the lens system 2 of long focal length. Thus, if the lens system 2 is formed of a bright lens (that is, of which the F-number is lower), a lens of larger aperture is required.

As other example of prior art projector apparatus, there has been proposed such an arrangement as illustrated in FIG. 3 in which two dichroic mirrors, 4a' and 4b' are intersected each other and placed at the same position. In this case, although the distance between each of the cathode ray tubes, 1R, 1G and 1B and the lens system 2 can be selected relatively small, the assembling and manufacturing processes become significantly troublesome in practice. Moreover, there is a defect that the color is deteriorated by the reflection of the light on the two dichroic mirrors, 4a' and 4b'.

For further example, as illustrated in FIG. 4, there has been proposed such a projector apparatus, which comprises one monochromatic cathode ray tube, for example, cathode ray tube 1G to produce a color component picture image of green and a cathode ray tube 1RB to produce two other color components of picture images, red and blue. The reproduced picture images therefrom are synthesized by a single dichroic mirror 4 and then projected onto a screen 3 through a common lens system 2 as a color picture image. In this case, the two component picture images of red and blue are provided by the common cathode ray tube 1RB and the green picture image of high visual sensitivity is provided by the monochromatic cathode ray tube 1G as a bright picture image thus the relatively bright color projected picture image being made. As compared with the prior art projector apparatuses of 3-tube type in FIGS. 1 to 3, the projector apparatus of the last example has such an advantage that this apparatus can be made compact in size and the assembling and manufacturing processes thereof become simple and easy.

Now, let us consider the cathode ray tube used in the projector apparatus. In the cathode ray tube, in order to reproduce a picture image of high brightness, the energy of electron beam to excite the phosphor screen thereof has to be increased, namely, an acceleration voltage of electron beam has to be increased or its beam current has to be increased. While, in the cathode ray tube of which the phosphor screen is separately coated with two kinds of light-emitting phosphor substances or more to provide picture images of more than two primary colors, for example, in the cathode ray tube 1RB of two picture images used in the prior art projector apparatus as shown in FIG. 4, the continuous use of this type cathode ray tube causes a color shift and the deterioration of color hue and at last, no bright color picture image can not be produced. The reason for this is that, the ordinary color cathode ray tube includes behind its phosphor screen an electron beam landing position determining electrode such as a shadow mask or an aperture grille provided with apertures through which the electron beam for respective colors lands on the respective color phosphor substances to determine the landing position of the electron beam on the phosphor screen. Accordingly, if the energy of electron beam is increased or the beam current thereof is increased in order to reproduce a bright picture not only the temperature of the phosphor screen is raised due to the impingement of electron beam thereon, but also the temperature of the electron beam landing position determining electrode is raised considerably because about 80 percent of the energy of electron beam is converted into heat by the impingement of electron beam on this electrode. Due to the fact that the inside of the tube envelope is kept at high vacuum degree, the heat generated on this electrode is difficult to be transferred to the outside therefrom so that the temperature of the electrode is raised to a rather high temperature. This leads to a great thermal expansion of the electrode such as the shadow mask or the aperture grille and then slackening occurs in these electrodes and cause the electron beam mislanding on the wrong position which produces color shift. While, due to the rise of temperature on the shadow mask or the aperture grille and further the impingement of electron beam on the phosphor screen itself, the significant rise of temperature on the phosphor screen is caused. The rise of temperature on the phosphor screen causes the deterioration in its illuminated brightness, namely, so-called thermal quenching of phosphor occurs. This thermal quenching is such a phenomenon that the brightness of phosphor substance is lowered with the rise of temperature thereof. Since the degree of the thermal quenching is different depending on the phosphor substances of respective colors, the white balance will become out of order. The disorder of the white balance is particularly remarkable in the center of the phosphor screen because the heat radiation effect is poor particularly in the center of the phosphor screen and the rise of temperature thereat is significant, leading to a disastrous deterioration of picture quality.

There has been proposed a so-called beam index type-color cathode ray tube to avoid the provision of the electron beam landing position determining electrode such as the shadow mask or the aperture grille facing to the phosphor screen used in the prior art cathode ray tube which can produce picture images of more than two colors as, for example, shown in FIG. 4. As is known well, such previously proposed beam index-type color cathode ray tube has a configuration such that on a phosphor screen formed of plural color phosphors to be a color phosphor pattern is located a detection section with a predetermined positional relation to the phosphor pattern to detect the scanning position of electron beam and the electron beam is controlled by the index signal to scan the predetermined phosphor. Consequently, unlike the cathode ray tube of ordinary shadow mask type or aperture grille type in which the electron beam landing position determing electrode such as the shadow mask or aperture grille is opposed to the phosphor screen formed on the inner surface of the panel, the cathode ray tube of beam index type can avoid the loss of the beam power caused by the masking with the electron beam landing position determining electrode thus providing the picture image brighter than that of the cathode ray tube of shadow mask type or aperture grille type.

However, recently, it has been requested or desired that the color projector apparatus has a more compactness, a simple construction, simplified assembling and manufacturing and easy handling. In addition, the demand of bright picture image of the projector apparatus is being increased. In this connection, even the color projector apparatus of 2-tube type explained in connection with FIG. 4 can not fully satisfy the requirements of the compactness and still has a problem that it is quite troublesome to determine the positional relationship of the two cathode ray tubes. Furthermore, even when as the cathode ray tube of 2-tube type color projector apparatus in FIG. 4, the cathode ray tube 1RB of beam index type is employed, due to the thermal quenching by the impingement of electron beam on the phosphor screen, the sufficient improvement of brightness can not be performed.

OBJECTS AND SUMMARY OF THE INVENTION

Accordingly, it is an object of this invention to provide a color projector apparatus which can obviate the aforesaid defects inherent in the prior art apparatus.

Another object of this invention is to provide a color projector apparatus of compact size of which the assembling, manufacturing and handling are quite easy and which can provide a color projected picture image with enough brightness and excellent picture quality.

Further object of this invention is to provide a color projector apparatus with a color cathode ray tube of beam index type capable of providing enoughly high brightness by increasing a power of electron beam under a given condition without raising a problem of color shift.

Still further object of this invention is to provide a color projector apparatus with a color cathode ray tube of beam index type which can produce a projected image bright and good in picture quality by removing a thermal quenching.

According to an aspect of the present invention, there is provided a color projector apparatus comprising:
(a) a single color cathode ray tube of index-type having a first transparent panel with phosphor elements of three primary colors and an indexing element formed on the inner surface thereof;
(b) a second transparent panel located in front of said first transparent panel of said cathode ray tube;
(c) a metal frame-shape spacer for supporting said second transparent panel; and
(d) a transparent liquid coolant filled into a space between said first and second transparent panels.

The other objects, features and advantages of the present invention will become apparent from the following description taken in conjunction with the accompanying drawings through which the like references designate the same elements and parts.

BRIEF DESCRIPTION OF THE DRAWINGS

FIG. 11 is a graph indicating a relation between a temperature of a panel thereof and a time duration of continuous use of a cathode ray tube; and FIG. 12 is a graph indicating a relation between like brightness and time duration.

DESCRIPTION OF THE PREFERRED EMBODIMENT

Hereinafter, an embodiment of a color projector apparatus according to the present invention will now be described with reference to the attached drawings.

Figure 1:
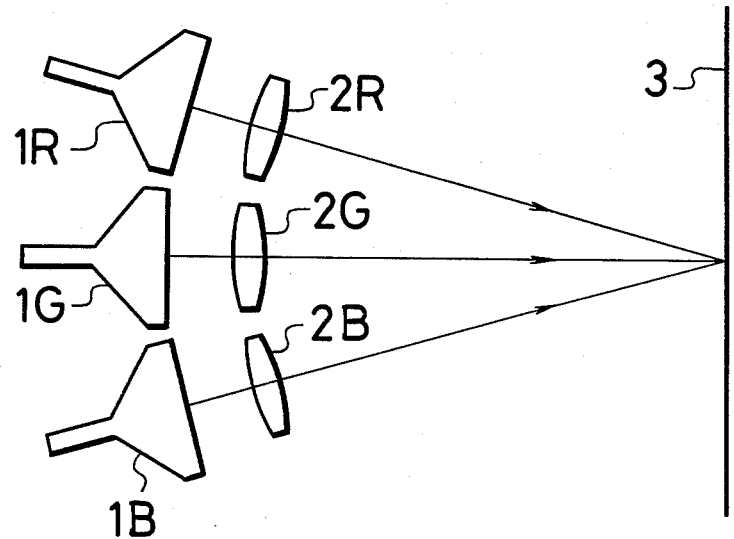
FIGS. 1 to 4 are respectively schematic diagrams each showing an example of a prior art color projector apparatus.
Figure 2:
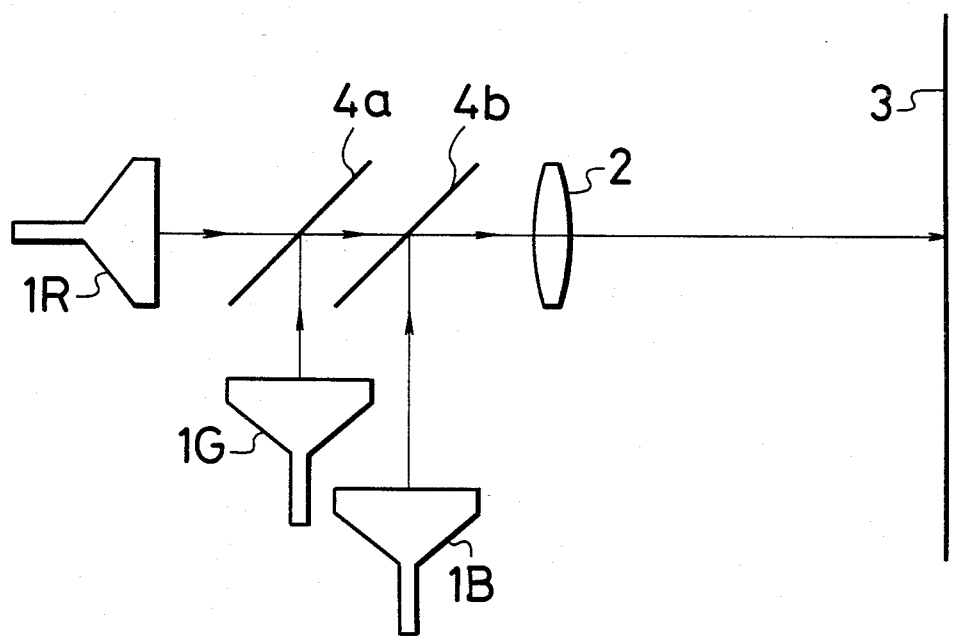
Figure 3:
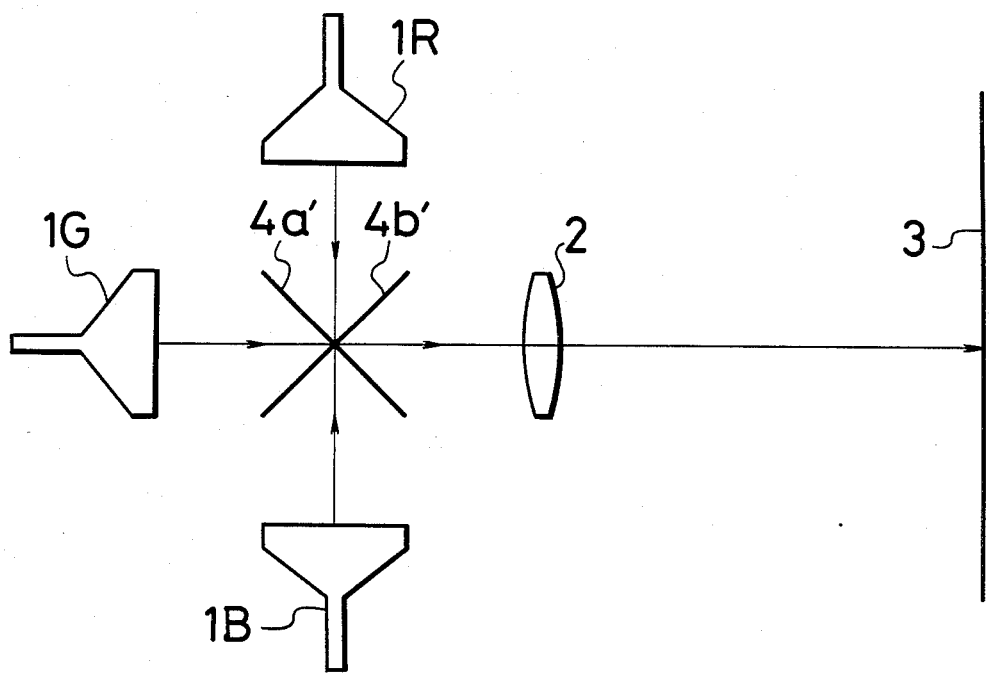
Figure 4:
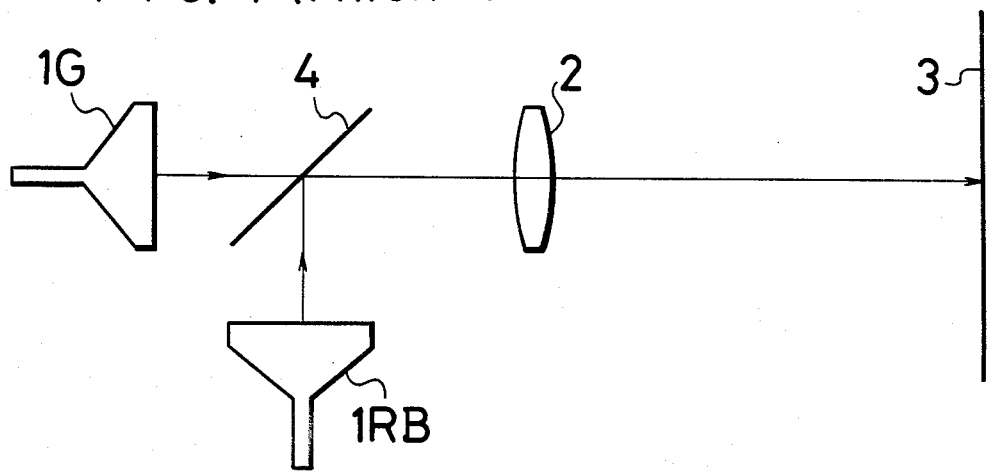
Figure 5:
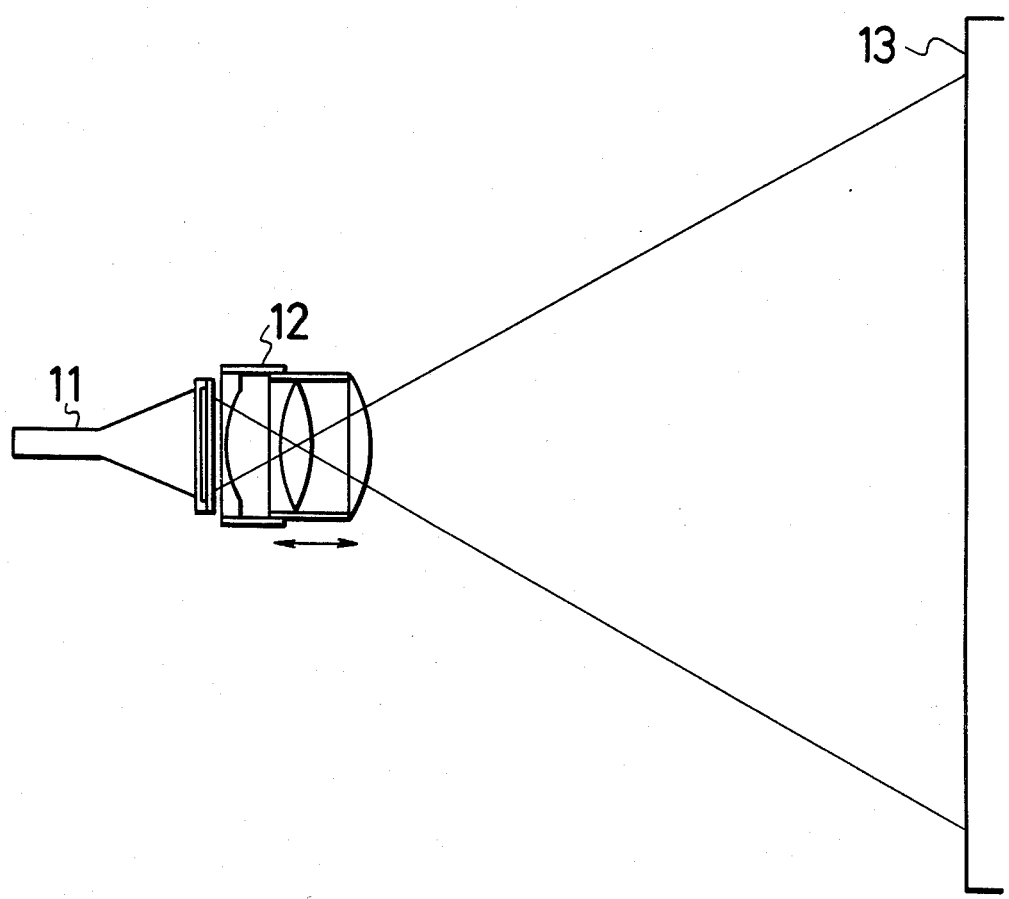
FIG. 5 is a schematic diagram of an embodiment of a color projector apparatus of single cathode ray tube type according to the present invention.
Figure 6:
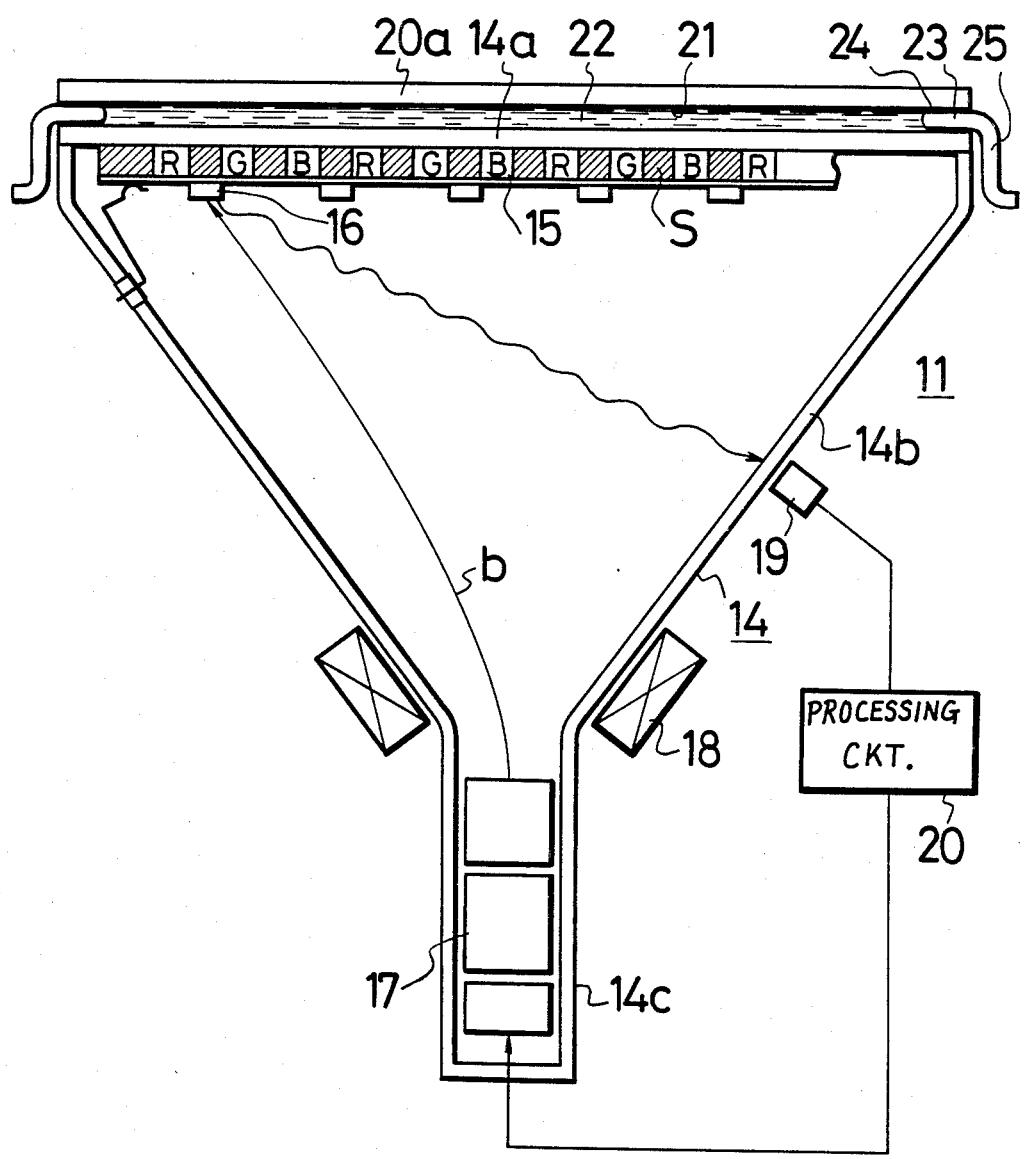
FIG. 6 is a schematic cross-sectional diagram of an example of a cathode ray tube used in the color projector apparatus according to this invention.

In this invention, as shown in FIGS. 5 and 6, color optical image of respective colors, for example, red, green and blue are formed by a single cathode ray tube 11, particularly a color cathode ray tube of beam index type. In the figures, 11 denotes generally a color cathode ray tube of beam index type. In FIG. 6, reference numeral 14 denotes a tube envelope 14 which consists of a panel 14a, a funnel 14b and a neck 14c. Particularly on the inner surface of this panel 14a is coated a phosphor screen 15 which consists of red, green and blue phosphor substances, R, G and B separately coated as of, for example, stripes with guard bands S of light absorbing material between adjacent color phosphor stripes. At the predetermined positions of this phosphor screen 15, for example, on and along the guard bands S located at the predetermined positions are coated index phosphor substances 16 for producing the index signal, for example, ultraviolet rays upon being excited by the electron beam. Reference numeral 17 denotes an electron gun located within the neck 14c. For example, one electron beam b emitted therefrom is deflected by a horizontal and vertical electromagnetic deflection device 18 to scan the phosphor screen 15 in the horizontal and vertical directions. Numeral 19 designates a photodetector which detects the ultraviolet ray emitted from the index phosphor substance 16 in response to the scanning of the electron beam b on the phosphor screen 15 and which then converts it to an electrical signal. The electrical or index signal derived therefrom is supplied to and converted to a desired control signal by a proper processor circuit 20. This control signal is supplied to the electron gun 17 to control the same whereby the beam b modulated by a video signal of predetermined color lands on the corresponding phosphor substance.

While, to the external surface of the panel 14a of the tube envelope 14 is faced a transparent panel 20a with a predetermined spacing kept therebetween. Between both the panels 14a and 20a is defined a liquid-tight space 21 which is filled with a liquid coolant 22. Between both the panels 14a and 20a is interposed a frame-shape spacer 23 made of, for example, aluminium of high thermal conductivity at four peripheral edges therebetween. The frame-shape spacer 23 and both the panels 14a and 20a are sealed together in liquid-tight manner by sealant 24 such as resin and silicone rubber or the like. A heat radiation fin 25 is elongated to the outside from the frame-shape spacer 23.

The liquid coolant 22 may be formed of a mixture of, for example, ethylene glycol of light transparency and of low viscosity and water, which is injected into the space 21 and then sealed therein in liquid-tight.

With the color projector apparatus arranged so far, a color picture image of three primary colors, for example, red, green and blue is reproduced by the single cathode ray tube 11 and then projected by a single lens system 12 onto the screen 13 (refer to FIG. 5). Consequently, in this case, it is possible to avoid troublesomeness upon assembling and manufacturing such as the positioning the cathode ray tubes, the use of a plurality of optical systems and the location thereof when the picture images reproduced by plural cathode ray tubes are synthesized and then projected onto the screen. Moreover, the overall arrangement of the color projector apparatus can be more compact-sized and the handling thereof can also be made easy.

Particularly in this invention, since the single cathode ray tube for producing the color picture image is formed of a cathode ray tube of beam index type and the beam index type-cathode ray tube also performs the effective liquid-cooling action, the color projector apparatus can provide the considerably bright color picture image of excellent picture quality.

Figure 7:
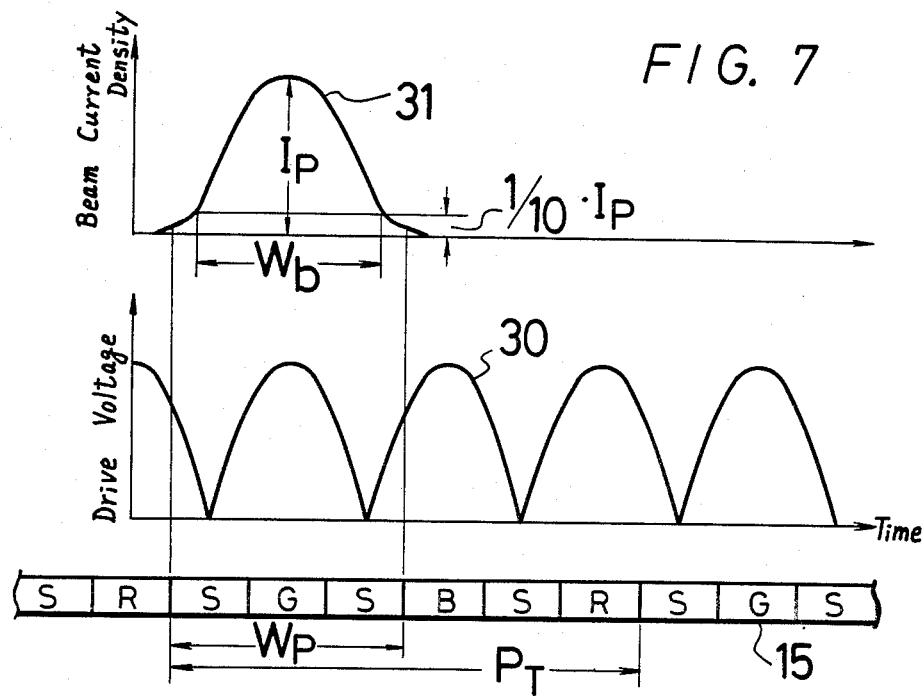
FIG. 7 is an explanatory diagram thereof.

Subsequently, the characteristics of beam index type-cathode ray tube will be described hereinafter. As illustrated in FIG. 7, let it be assumed that an alignment pitch $P_T$ of stripe-shaped phosphor substances, R, G and B of respective colors on the color phosphor screen 15 of the color cathode ray tube 11 shown in FIG. 6, namely, a width of one set of or triplet of the adjoining red, green and blue stripe-shaped phosphor substances, R, G and B be selected as 0.36 mm. Also, let us assume that a width from one phosphor stripe to the adjoining phosphor stripes at its respective sides or a beam landing tolerance width $W_p$ within which the electron beam is allowed to land on one phosphor stripe be selected as 0.18 mm. Under this condition, let us examine the drive waveform shown by numeral 30 in FIG. 7 on the phosphor screen 15 in the direction across the phosphor stripes, R, G and B thereof or the drive waveform in which the maximum point of the drive voltage is positioned at the time when the beam scans substantially the center of each phosphor stripe and the minimum point thereof is positioned at the time when the beam scans substantially the centers of the guard bands S at the both sides of each of the respective color phosphor stripes. This examination reveals that the distribution of the beam current density of beam spot (relative to each phosphor stripe) is represented as Gaussian distribution indicated by a curve 31 in FIG. 7. Thus, in order to avoid the occurrence of color shift among the phosphor stripes, it is necessary that, the width $W_b$ of the beam spot having the Gaussian distribution at the maximum point of the drive voltage does not lie across the adjoining phosphor stripes, in other words, the width $W_b$ of the beam spot has to be less than or equal to the beam-landing tolerance $W_p$ ($W_b \leqq W_p$).

In this case, even if the skirts of the beam spot lie across the adjoining phosphor stripes it is enough or causes no trouble that if, as compared with the light emission of the phosphor substance at the center of the beam spot, the light emission of the phosphor stripe resulting from the impingement of the electron beam on the skirt portion of the beam spot is substantially negligible. In this case, such value can be regarded as being one tenth the maximum current density $I_p$ of the beam spot so that the effective width $W_b$ of the beam spot is selected as the width between both of one tenth the maximum current density $I_p$ in one drive waveform as shown in FIG. 7.

Now, an explanation will be given on a power P of electron beam substantially striking each phosphor substance upon scanning. Taking an acceleration voltage of an electron beam, namely, phosphor screen voltage as $H_v$ and considering the existence and the effective amount of the guard band S (assuming that the respective phosphor stripes, R, G and B and the guard bands S be the same in width), this power P is given as follows:

$$P = \tfrac{1}{2} \times 1/6(I_p \times H_v)$$

Figure 8:
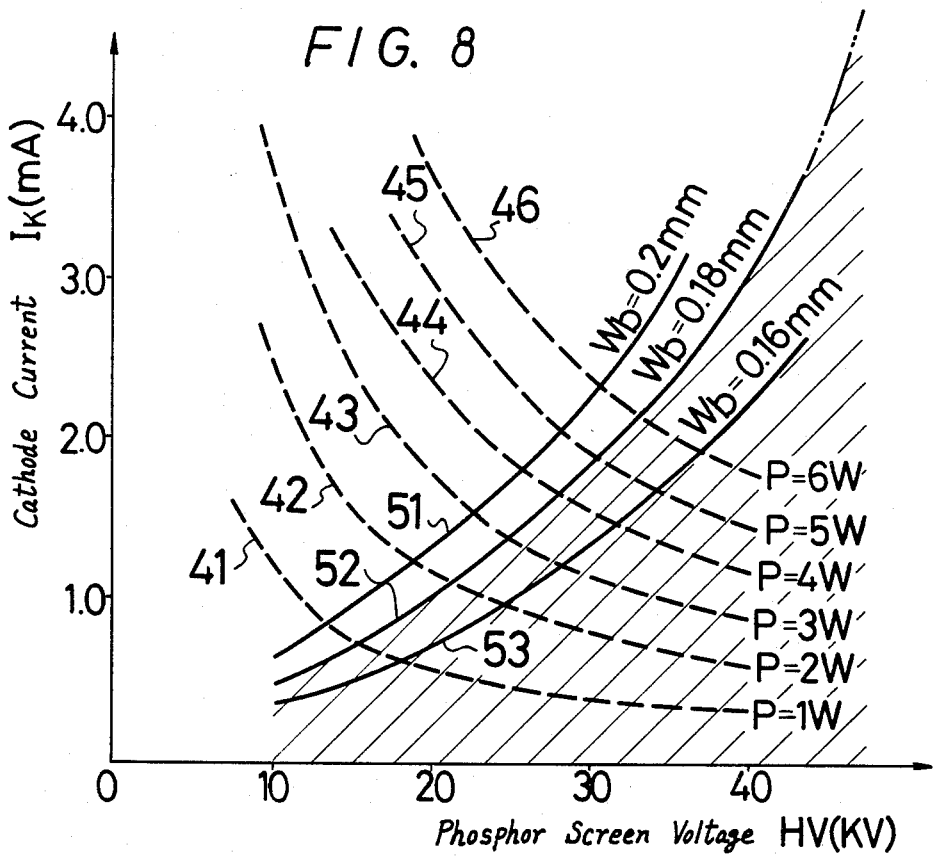
FIG. 8 is a graph indicating a relation between beam power and an acceleration voltage and cathode current.

An examination is made of a relation between the phosphor screen voltage $H_v$ and a cathode current $I_K$ (at the peak of drive) when the power P is respectively varied as 1 to 6W. Then, the above relation is indicated by broken line curves 41 to 46 in the graph of FIG. 8, respectively. In this case, before the points where the width $W_b$ of the beam spot, as aforesaid, is respectively 0.2 mm., 0.18 mm and 0.16 mm are searched for on the curves 41 to 46, it is ascertained that the plots of the respective cases where the width $W_b$ of the beam spot is 0.2 mm, 0.18 mm and 0.16 mm are drawn as curves 51, 52 and 53, respectively. Accordingly, when, the beam-landing tolerance width $W_p$ of one phosphor stripe is selected as 0.18, as aforesaid, if the beam power P is increased so that the values of the voltage $H_v$ and the cathode current $I_K$ are selected in a range of hatched area including and below the curve 52 in FIG. 8, it is noted that the beam spot is prevented from extending to other phosphor stripes to cause no color shift or misregistration. Then, the light emission intensity of the phosphor substance is dependent on the beam power P or, when the beam power P increases the light emission intensity also increases. This reveals that while the beam power P is increased enough, it is possible to increase the light-emission intensity of the phosphor substance without causing the color shift.

For the sake of comparison, like examination is made on the conventional cathode ray tube including the electron beam landing position determining electrode such as the shadow mask or the aperture grille located to face the phosphor screen. The beam power P of a beam impinging on a phosphor substance through the electron beam landing position determining electrode of which the beam transmission factor is 20 percent (1/5) is given as follows:

$$P = 1/5 I_K \cdot H_v$$

Figure 9:
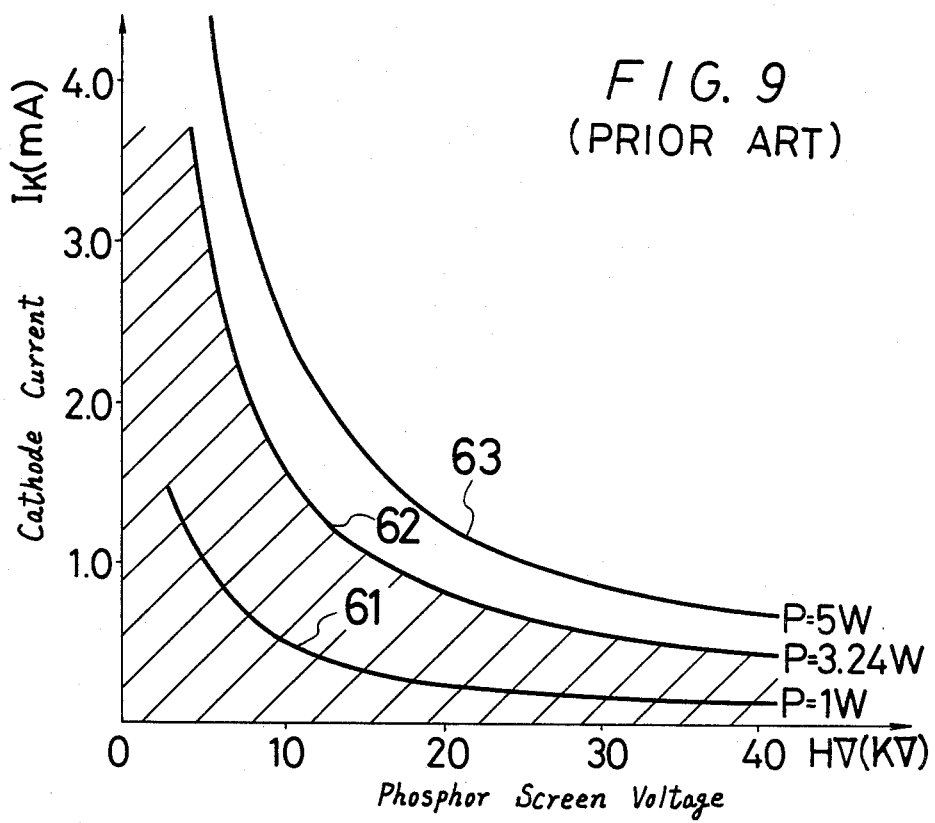
FIG. 9 is a like graph of a cathode ray tube having an electron beam landing position determining electrode.

A relation between the phosphor screen voltage $H_v$ and the cathode current $I_K$ (in this case, the sum of cathode currents with respect to triple beams corresponding to red, green and blue) when this beam power P is respectively selected as 1W, 3.24W and 5W is indicated by curves 61, 62 and 63 in FIG. 9, respectively. In this case, since the landing of the beam on each color phosphor stripe is determined by the electrode such as the shadow mask or the like, the diameter of the beam spot itself is irrelevant to the color shift. Apart from the problem of resolution of picture image, the large diameter of the beam itself does not cause any trouble. However, 80% of the electron beam impinges on the electrode such as the shadow mask or the like to urge the rise of temperature of the electrode such as the shadow mask or the like and thereby the electrode is subjected to thermal expansion thus the position of the beam passing apertures are shifted. On the basis of this experiment it is concluded that the color shift did not take place in a range of hatched area in FIG. 9. In other words, it was ascertained that the cathode ray tube equipped with such electron beam landing position determining electrode could not increase the beam power or the light emission intensity of the phosphor substance without causing color shift.

On the basis of such clarification, the color projector apparatus according to this invention adopts a beam index tube as the single cathode ray tube.

However, notwithstanding the essential improvement of brightness, as mentioned before, there still remains a unsolved problem of thermal quenching inherent in the phosphor substance itself.

Figure 10:
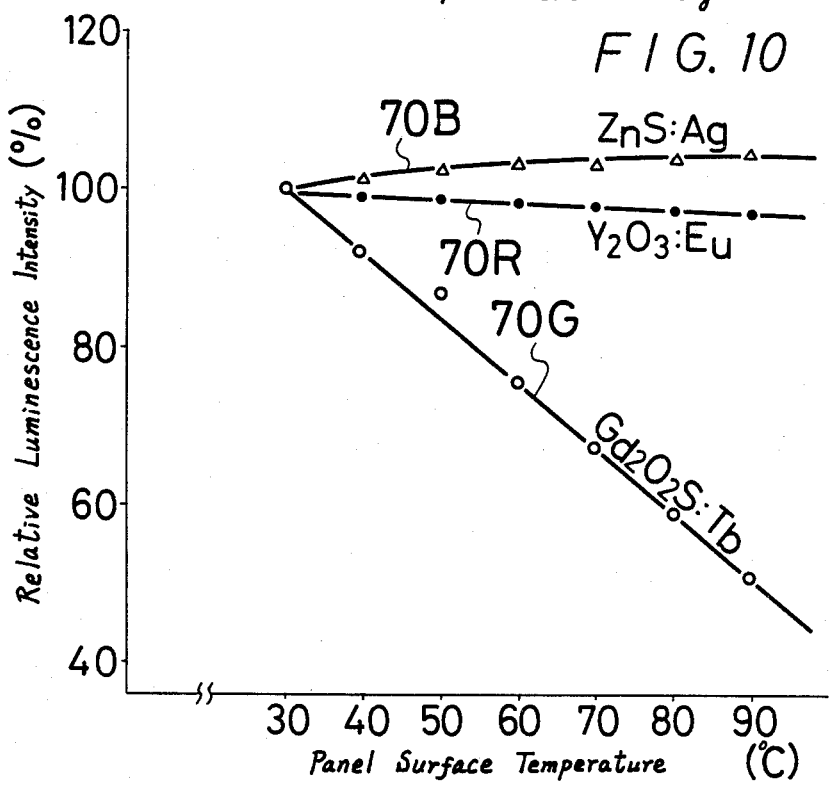
FIG. 10 is a graph indicating a relation between a brightness of phosphor substance and its temperature.

In FIG. 10, curves 70B, 70R and 70G respectively indicate change amounts of luminescence intensity versus the temperature of the panel surface where each intensity of blue emitting phosphor substance, ZnS:Ag, red emitting phosphor substance, $Y_2O_3$:Eu and green emitting phosphor substance, $Gd_2O_2S$:Tb coated on the inner surface of the panel in the cathode ray tube envelope is taken as 100% at room temperature. As is clear from FIG. 10, the thermal quenching is remarkable in the green phosphor substance, $Gd_2O_2S$:Tb. The remarkable deterioration of intensity in the green phosphor substance which has high visual sensitivity results in disastrous disorder in white balance, damaging the picture quality.

However, in the aforesaid configuration of this invention, since the phosphor screen 15 is coated particularly on the panel 14a of the tube envelope 14 and the liquid coolant 22 is located in front of this panel 14a, the temperature increase of the panel 14a can be avoided effectively, and also the thermal quenching of the phosphor substance can be prevented. To be more concrete, with the configuration according to the present invention, as shown in FIG. 6, in front of the panel 14a, there is provided the space 21 which is filled with the liquid coolant 22. When the temperature is raised particularly at the center of the panel 14a where the heat is difficult to be radiated or dispersed, this causes the rise of temperature in the liquid coolant 22 which is in contact with the center part of the panel 14a. If the panel 14a is erected substantially along the direction of gravity, the portion of the liquid coolant 22 with increased temperature reduces its specific gravity and moves upward in the space, giving rise to convection therein. Thus, the heat at the center of the coolant 22 is transferred to the peripheries thereof to avoid the local temperature rise. In addition, the heat transferred to the periphery can be radiated with high efficiency from the periphery thereof by way of, for example, the frame-shape spacer 23 and the elongated fin 25 so that the temperature of the panel 14a is prevented from being raised considerably.

In FIG. 11, a curve 81 indicates a result of measuring the change of temperature at the center of the panel 14a in the cathode ray tube 11 with the configuration according to this invention relative to time when only the center part of the panel 14a is continuously illuminated, while a curve 82 in FIG. 11 indicates a result of measuring the change of temperature on the panel of the similar prior art cathode ray tube with no liquid cooling means. As is clear from the comparison of the curve 81 with the curve 82, the rise of temperature can effectively be avoided according to the configuration of the present invention.

While, curves 91 and 92 in FIG. 12 respectively indicate measured results of change amounts (relative values) of brightness in the green phosphor substance $Gd_2O_2S$:Tb resulting from the corresponding changes of temperature on the panel 14a which already were explained by the curves 81 and 82 in FIG. 11. The graph of FIG. 12 manifests that, according to this invention, the deterioration of brightness, namely, the thermal quenching is effectively avoided. In this measurement, the phosphor screen voltage $H_v$ is selected as 26 KV and the cathode current $I_k$ as 430μA.

As described above, this invention makes effective use of the characteristics of the index-type cathode ray tube to form the color projector apparatus of single tube type and thereby a bright color projected picture image with excellent picture quality can be obtained. In association with the advantages upon assembling, manufacturing and handling the single tube type, the color projector apparatus of this invention is remarkably advantageous in the practical use.

By the way, in the color projector apparatus of the invention, when the effective picture screen size (diagonal length) of the cathode ray tube 11 is selected as 5 inches, the phosphor stripe pitch $P_T$ as 0.36 mm, the phosphor screen voltage $H_v$ as 33 KV, the mean cathode current as 0.5 mA and when the respective color phosphor substances, R, G and B are formed of $Y_2O_3$:Eu, $Gd_2O_2S$:Tb and ZnS:Ag, the F-number of the lens system 12 is selected as 1.0 and the screen gain as 5.0, the brightness of the standard color bar white portion on the 50-inch picture screen becomes 16 FL. While, that of the projector apparatus using a cathode ray tube of Trinitron (registered trade mark) type having an aperture grille of the same size and pitch is made 9FL.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

We claim as our invention:

1. A high brightness cathode ray tube comprising:
    (a) a single, color cathode ray tube of index-type having a first transparent panel with phosphor elements of three primary colors and an indexing element formed on the inner surface thereof;
    (b) a second transparent panel located in front of said first transparent panel of said cathode ray tube;
    (c) a metal frame-shape spacer for supporting said second transparent panel; and
    (d) a transparent liquid coolant filled into the space between said first and second transparent panels.

2. A high brightness cathode ray tube according to claim 1, wherein said metal frame-shape spacer is in contact with said transparent liquid coolant and has heat radiation properties.

3. A high brightness cathode ray tube according to claim 1, wherein said metal frame-shape spacer is interposed between said first and second transparent panels and is sealed therebetween by an elastic sealant.

* * * * *